Sept. 10, 1968                D. P. JONES                3,400,977
       BELT MOUNTING DEVICE WITH TUBULAR ENERGY ABSORPTION MEMBER
Filed May 15, 1967                                  2 Sheets-Sheet 1
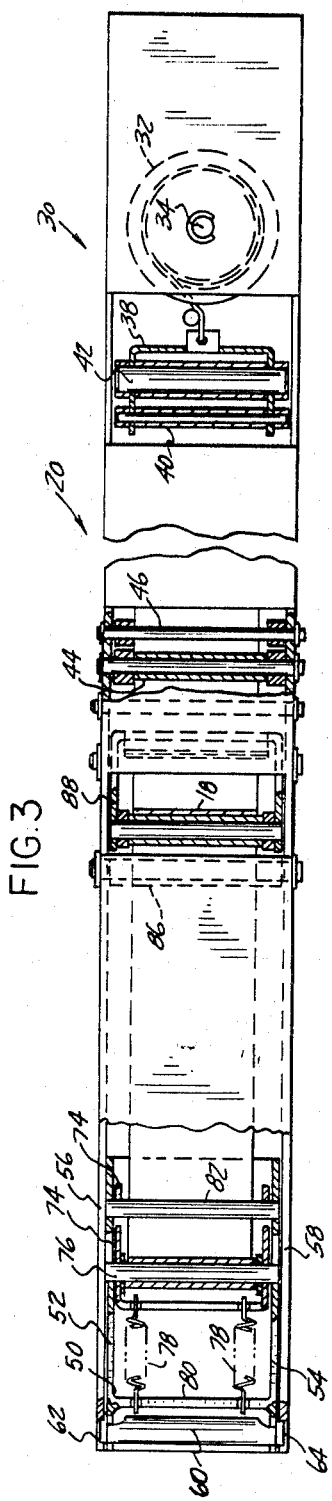
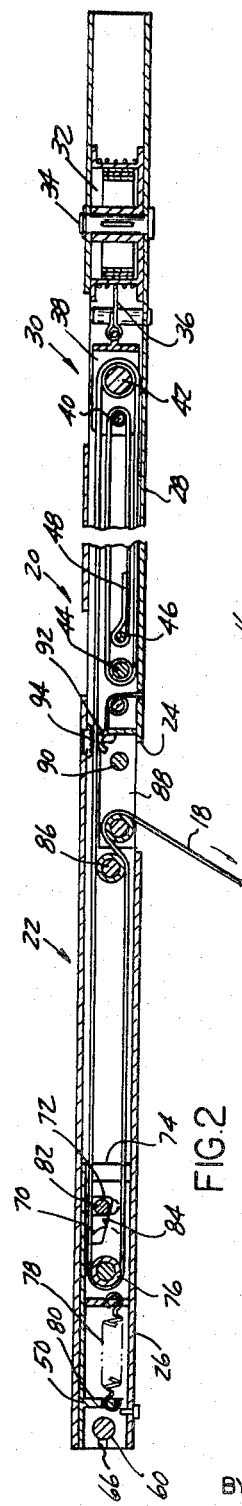
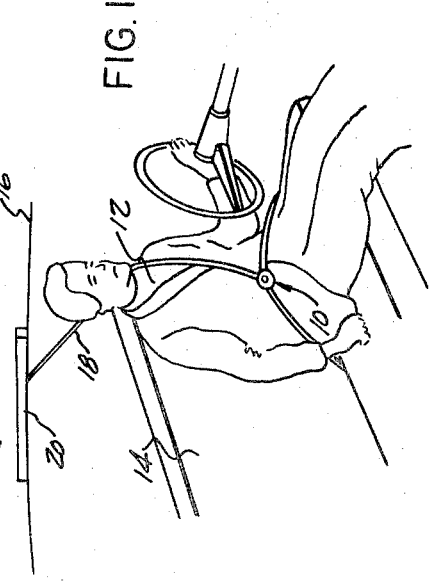
INVENTOR
DAVID P. JONES
BY Hauke, Krass, & Gifford
                    ATTORNEYS Sept. 10, 1968  D. P. JONES  3,400,977
BELT MOUNTING DEVICE WITH TUBULAR ENERGY ABSORPTION MEMBER
Filed May 15, 1967  2 Sheets-Sheet 2

INVENTOR
DAVID P. JONES

BY *Hauke, Krass, & Gifford*
ATTORNEYS

United States Patent Office 3,400,977
Patented Sept. 10, 1968

3,400,977
BELT MOUNTING DEVICE WITH TUBULAR
ENERGY ABSORPTION MEMBER
David P. Jones, Detroit, Mich., assignor to Jim Robbins
Seat Belt Co., Royal Oak, Mich.
Filed May 15, 1967, Ser. No. 638,215
11 Claims. (Cl. 297—386)

ABSTRACT OF THE DISCLOSURE

A vehicle safety seat belt mounting attached to the roof of the vehicle. Spring-biased retracting means mounted within an elongated tube withdrawing the belt toward a stored position within the tube. Locking means responsive to a sharply increased belt feedout rate from the tube, clamping the belt to a longitudinally movable guide member disposed within the tube and having teeth engaging the tube walls. A predetermined tensile force acting on the belt extends the belt at a controlled and reduced rate as the teeth of the guide member abrade the tube walls.

BACKGROUND OF THE INVENTION

I. Field of the invention

This invention relates to means for connecting a vehicle safety seat belt to the vehicle and more specifically to a seat belt mounting attached to a fixed part of the vehicle and having retractor means normally permitting a relatively free longitudinal movement of the belt between stored and extended positions and means for transferring the operative connection between the belt and the vehicle upon the occurrence of violent forces acting on the vehicle from the retracting means to an energy-absorbing mounting which controls the belt extension to provide a cushioned restraint on the occupant.

II. Description of the prior art

Occupant restraining systems have become mandatory in modern day vehicles to reduce the extent of the injuries caused by the vehicle experiencing a sudden deceleration as a result of a collision or the like. These injuries result from the weight of the unrestrained, seated occupant creating a momentum tending to displace him from his seated position toward contact with various non-yielding, injury producing portions of the interior vehicle structure. Conventional occupant restraining systems take the form of an arrangement of belts which encircle the torso of the occupant with means for anchoring the terminal ends of the belt to a relatively unyielding fixed part of the vehicle.

There are two major drawbacks associated with conventional seat belt mounting devices which manifest themselves in the general reluctance of the occupants to utilize the seat belt arrangement.

The first major drawback is that conventional seat belt mounting devices restrict the occupant from performing normal body movements such as leaning forward with respect to his seat under normal conditions. Thus, in order to perform a movement requiring relative displacement of his body with respect to the seat, he must either unfasten the coupled sections of the belt or loosen the belt so that he has sufficient slack to move. Obviously if the occupant either unfastens or loosens the belt, it does not function as a restraint in the event of a sudden collision.

The second major drawback to conventional seat mounting devices is that in the event of a collision or other occurrence producing a sudden and violent opposition to the movement of the vehicle, the vehicle and the seat belt simultaneously experience a sudden deceleration. However, the weight of the occupant restrained by the seat belt creates a momentum tending to displace him in a direction generally corresponding to the previous motion of the vehicle. This displacement is restrained by the seat belt system so that the occupant remains in a generally restricted area. However, the body restraining forces acting through the unyielding seat belt often produce serious internal injuries.

The preferred embodiment of the present invention obviates the aforementioned problems of the conventional seat belt mounting devices by providing an improved mounting device which allows the occupant to perform normal body movements and which in the event of an occurrence producing a violent force on the vehicle restrains the occupant in a manner whereby he experiences a cushioned and limited displacement with respect to his seat.

SUMMARY

The preferred embodiment of the present invention, which will be subsequently described in greater detail, is described with reference to a safety seat belt assembly having a section of belt which is extensible from a seat belt mounting attached to the roof of the vehicle to provide an upper torso restraint for the occupant.

The preferred seat mounting device comprises an elongated tubular member attached to the vehicle roof and having a rectangular cross-section with a belt retracting device mounted adjacent a first end of the tubular member and a guide member mounted at the second opposite end. The belt extends and retracts through an opening formed in the midportion of the tubular member. The guide member has laterally directed teeth seated in short slots formed in the sidewalls adjacent the second end of the tubular member and a belt clamping device connected to the guide member. The belt extends from the belt retracting device longitudinally through the tube to the belt clamping device which normally guides it toward the opening and the occupant. A sharp jerk on the belt actuates the clamping device which then provides a rigid connection between the belt and the guide member so that further extension of the belt from the retracting device is prevented. If the tensile force acting on the belt is of a predetermined magnitude, the guide member commences to move in any energy-absorbing path toward the belt-receiving opening so that the section of belt between the clamping device and the opening is extended at a reduced rate through the opening. The rate of belt extension is controlled by the cutting edges of the teeth on the guide member abrading elongated grooves in the inner surface of the tube side walls.

The preferred embodiment of the present invention provides a number of advantages over conventional automatic retracting devices including its streamlined and slender configuration which permits it to be mounted either in an overhead position or in a seat back. The surface-scraping energy-absorbing feature provides a positive mechanical means for providing a cushioned and gradual extension of the belt in the event of an abnormal situation while permitting the belt to be relatively freely extensible from its stored position under normal situations.

It is therefore an object of the present invention to provide an energy-absorbing seat belt mounting for a vehicle seat belt system which permits the occupant of the seat belt system to perform normal movements and which reacts to a force producing a sudden displacement of the occupant with respect to his seated position by limiting the displacement to a controlled, cushioned movement.

It is another object of the present invention to provide an energy-absorbing seat belt mounting device for an overhead mounted section of a vehicle safety seat belt system.

It is still another object of the present invention to provide a vehicle seat belt mounting comprising a support member attached to the vehicle, a belt retracting device mounted to the support member and normally permittinng a relatively free extension and retraction of the belt between stored and extended positions, energy-absorbing means mounted to the support member between the retracting device and the extended portion of the belt, and means for clamping the belt to the energy-absorbing means in the event of an occurrence producing an extension of the belt from the retracting device at a high and abnormal rate so that the energy-absorbing means control the extension of the belt, the energy-absorbing means comprising a toothed member having transverse cutting edges and which is pulled by the belt through a fixed tube with the teeth abrading the tube walls.

A still further object of the present invention is to provide in a vehicle having a seat assembly and an elongated section of belt having an extended operating section adapted to form a part of an occupant restraint system, a belt mounting comprising an elongated tubular member of substantially uniform interior cross section and rigid sidewalls of a first material, being fixedly mounted to the vehicle; a guide member disposed in the tubular member; laterally directed teeth carried by the guide member having a length so that the cutting edges of the teeth and the walls of the tubular member provide an interference to the longitudinal movement of the guide member in the tubular member, the teeth being formed of a second material, harder than the first material so that the application of a predetermined force on the guide member in a longitudinnal direction moves the guide member at a controlled rate with the cutting edges of the teeth abrading the surface of the sidewalls; and means arranged to attach the seat belt to the guide member upon the application of the predetermined tensile force on the belt so that the belt extends at a reduced rate from the tubular member.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIGURE 1 is a perspective view of a vehicle seat belt assembly arranged to restrain the occupant of a vehicle seat and with one section of the seat belt assembly mounted to the roof of the vehicle by a seat belt mounting illustrating the preferred embodiment of the invention;

FIGURE 2 is an enlarged elevational sectional view through the seat mounting device of FIGURE 1 with parts of the take-up unit omitted for purposes of clarity;

FIGURE 3 is a plan view of the preferred seat belt mounting with parts in section.

DESCRIPTION OF THE PREFERRED EMBODIMENT

Figure 4:
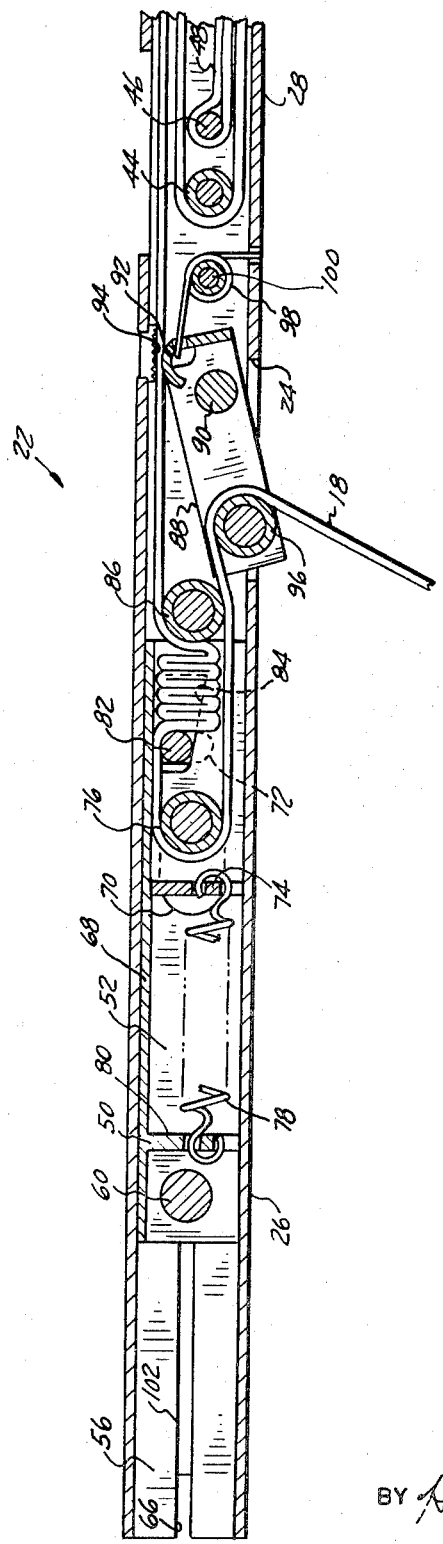
FIGURE 4 is an enlarged sectional view of the energy-absorbing section of the preferred seat belt mounting illustrating the guide member at the completion of its energy-absorbing travel.

Now referring to the drawings, FIGURE 1 illustrates a seat belt assemby 10 arranged to provide both lap and upper torso restraints on an occupant 12 seated on a seat assembly 14 of a vehicle 16.

An overhead mounted section of belt 18 extends diagonally across the upper torso of the occupant 12 with its upper end mounted to the vehicle 16 by a seat belt mounting device 20 illustrating a preferred embodiment of the present invention. The belt 18 comprises a relatively non-stretchable section of webbing.

Referring to FIGURES 2 and 3, the seat mounting device 20 comprises an elongated support tube 22 attached to the roof of vehicle 16 and having a generally uniform and rectangular cross-section throughout its length. A belt receiving opening 24 at a mid-portion of the tube 22 divides the tube into a first section 26 and a second section 28. The tube 22 is preferably formed of a relatively soft, but rigid material such as aluminum and is arranged so that the opening 24 is preferably above and behind the shoulder of the occupant 12.

A belt retracting device 30 is mounted within the tube 28 and includes a spring biased wind-up drum 32 mounted adjacent the end of the section 28 and mounted on a pin 34 fixed to the upper and lower walls of the section 28. A cable 36 is wrapped around the drum with its free end attached to a yoke 38. The yoke 38 is slidably mounted in the tubular section 28 and carries a pair of spaced apart take-up rollers 40 and 42. The rollers 40 and 42 are supported for rotation about axes on axes transverse to the movement of the belt 18 and move as a unit with the yoke 38. A third take-up roller 44 is supported by the sidewalls of the tubular section 28 and longitudinally spaced from the wind-up drum 32. An anchor pin 46 is also attached to the sidewalls of the tubular section 28 adjacent the roller member 44.

The terminal end 48 of the belt 18 is wrapped around the anchor pin 46 and secured to itself preferably by stitching or the like. The belt 18 extends from the anchor pin 46 and is successively wrapped around rollers 40, 44 and 42 in a series of parallel and linear lengths. The belt extends from the roller 42 toward the tubular section 26.

The yoke 38 is movable between a first position wherein the roller member 40 closely approaches the anchor pin 46 and a second position wherein the yoke 38 closely approaches the wind-up drum 32. The first position of the yoke 38 corresponds to the fully extended condition of the belt 18 and the second position of the yoke corresponds to the fully stored position of the belt 18. The yoke 38 is biased toward the second position by the wind-up drum 32 and cable 36 so that any slack in the extended section of the belt 18 is always taken up. The wind-up drum 32 however permits the belt 18 to be relatively freely extended to accommodate the movements of the occupant 12 as he reaches or leans forward with respect to his seated position so that he is relatively unrestrained in his movemennts under normal conditions. As the occupant moves forwardly and rearwardly with respect to his seated position, the belt 18 extends from and retracts into the tube 22 with the yoke 38 moving toward and away from the anchor pin 46 to either feed out a length of belt to accommodate a pull-out force acting on the belt 18, or to take up any slack in the belt 18.

The belt 18 extends forwardly from the belt retracting device 30, adjacent the upper wall of the tube 22, past the opening 24 and toward a guide member 50 disposed adjacent the open end of the tubular section 26. The guide member 50 has a pair of spaced apart side sections 52 and 54 mounted adjacent sidewalls 56 and 58 of the tubular section 26. An elongated member 60 having laterally directed teeth 62 and 64 is carried by the guide member 50. The length of the member 60 is greater than the distance between the sidewalls 56 and 58 of the tubular section 26 with the cutting edges of the teeth 62 and 64 seated in slots 66 formed in each of the sidewalls 56 and 58. As best seen in FIGURE 3, the length of the member 60 is such that the cutting edges of the teeth extend approximately half the thickness of the sidewalls 56 and 58 in a direction laterally outward from the inner surface of the sidewalls. The teeth 62 and 64 are formed of a material harder than the sidewalls 56 and 58 and preferably of a relatively inexpensive steel.

As best seen in FIGURE 4, a flat upper section 68 connects the side sections 52 and 54 of the guide member 50 and extends toward the tongue-receiving opening 24.

A pair of slots 70 formed in the side sections 52 and 54 extend in a longitudinal direction with respect to the tubular section 26. A second pair of slots 72 are also provided in the side sections 52 and 54 and are formed along an axis at right angles to the longitudinal axis of the tube section 26. The upper end of the slots 72 terminates closely adjacent the flat section 68.

A substantially U-shaped slide member 74 is slidably disposed within the side sections 52 and 54 of the guide member and supports a guide roller 76 for rotation about an axis transverse to the movement of the belt 18. The outer ends of the guide roller 76 are disposed in the slots 70 so that the displacement of the slide member 74 with respect to the guide member 50 is defined by the slots 70.

A pair of spring members 78 connect the slide member 74 to a transverse portion 80 of the guide member 50 so that the slide member 74 is normally biased toward its left-most position which is illustrated in FIGURE 2.

A locking roller 82 having its opposite ends disposed in the transverse slots 72 rides on inclined cammed surfaces 84 provided in opposite sides of the slide member 74. It can be seen that the locking roller 82 is movable toward and away from the flat portion 68. The position of the locking roller 82 with respect to the flat portion 68 depends on the longitudinal position of the slide member 74 with respect to the guide member 50. Thus, when the slide member 74 is in its left-most position, the locking roller 82 is seated on the lower part of the cam surface 84 and is spaced from flat section 68. As the slide member 74 moves toward the right, and assuming the guide member 50 remains stationary, the locking roller is forced by the cam surfaces 84 upwardly in the slots 72 and toward the flat section 68. This position is best illustrated in FIGURE 4.

The belt 18 moves adjacent the lower surface of the flat section 68 and over the locking roller 82, and then around the guide roller 76 and toward the belt receiving opening 24. As the locking roller 82 is forced vertically upwardly, it moves into a belt-clamping position. Thus when the slide member 74 is in its left-most position with respect to the guide member 50, the belt 18 can freely travel between the locking roller 82 and the flat section 68 and around the guide roller 76. However, as the slide member 74 moves toward the right with respect to the guide member 50, the locking roller 82 approaches and clamps the belt 18 against the flat section 68.

Now referring to FIGURES 2 and 3, a guide roller 86 is mounted to the sidewalls 56 and 58 of the tubular section 26 adjacent the belt-receiving opening 24. The belt 18 thus rides over the top of the roller 86 as it moves toward the guide member 50 and rides on the lower surface of the guide roller 86 as it approaches the opening 24 from the guide roller 76.

A substantially U-shaped member 88 is pivotally attached by a pin 90 adjacent the opening 24 and has a curved abutment portion 92 closely adjacent a second abutment portion 94 provided in the upper wall of the tubular member 22. A guide roller 96 is supported by the legs of the member 88 closely adjacent the guide roller 86. The member 88 is pivotable about the pin 90 between a raised position wherein the abutment portions 92 and 94 are spaced apart from one another to permit the belt 18 to pass freely therebetween, and a lower position wherein the abutment portions 92 and 94 approach one another to clamp the belt 18 therebetween.

A spring bias member 98 wrapped around a pin 100 supported by the sidewalls of the tubular section 22 normally biases the member 88 to its raised position so that the belt passes freely between the abutment portions 92 and 94. However, as can be seen in FIGURE 4, the belt is wrapped over the top of the guide roller 96 and downwardly toward the occupant 12. Thus, when the occupant 12 applies a gradual pull-out force on the belt 18 to accommodate his normal body movements, the spring bias member 98 has a stiffness such that the belt 18 freely extends to accommodate these movements. However, a sharp jerk on the belt 18 pivots the member 88 as the roller 96 is forced downwardly so that the abutment portions 92 and 94 clamp the belt to temporarily prevent any further extension of the belt from the retracting device 30.

If the force producing the excessive feed-out on the belt 18 continues, and with the abutment portions 92 and 94 clamped on the belt 18, the belt 18 will continue to extend through the belt receiving opening 24 as the slide member 74 moves toward the opening 24 and against the bias of the spring 78. The slide member 74 travels toward the right until the roller 76 has reached the end of the slots 70 at which time the force acting on the belt is transmitted through the roller 76, the side sections 52 and 54 of the guide member, the teeth 62 and 64 and the sidewalls 56 and 58 of the tubular section 26.

It can be seen that as the slide member 74 moves toward the right that the belt 18 is clamped by the locking roller 82 to the guide member 50. If the force acting on the belt 18 is of a predetermined magnitude, the guide member 50 commences to move toward the right with the teeth 62 and 64 scraping grooves 102 in the sidewalls 56 and 58. This groove scraping action retards the movement of the guide member 50 to a controlled rate so that the belt 18 extends in a controlled manner with the occupant experiencing a cushioned and limited displacement from his seat. As the guide member 50 moves toward the right in its energy-absorbing stroke, the belt 18 tends to accumulate in a pleated fashion ahead of the locking roller 82. The extreme end of the travel of the guide member 50 is defined by the forward edges of the side sections 56 and 58 moving into abutment with the guide roller 86.

In summary, the normal position of the guide member 50 is adjacent the extreme left end of tubular section 26 with the scraping teeth 62 and 64 seated in the slots 66. The slide member 74 is biased towards its left-most position with the locking roller 82 in an unclamped position so that the belt is freely extendible from the belt retracting device 30 to accommodate the movements of the occupant 12. A sudden sharp jerk or rapid increase in the feed-out of the belt 18 pivots the member 88 so that the belt is temporarily clamped by the abutment portions 92 and 94. This temporary clamped condition permits the locking roller 82 to move into a position wherein it clamps the belt 18 to the guide member 50 as the slide member 74 moves toward the right under the influence of the tensile force acting on the belt 18. At the completion of the displacement of the slide member 74 toward the right with respect to the guide member 50, the guide roller 76 provides a stress-transmitting connection from the belt 18 to the teeth 62 and 64 while simultaneously the belt 18 is clamped by the locking roller 82 to the guide member 50. The guide member 50 then commences its energy-absorbing stroke toward the right and the opening 24 so that the belt gradually extends in a controlled rate with the teeth 62 and 64 abrading the grooves 102 in the tubular section 26.

Although only one preferred embodiment of the invention has been described, it is to be understood that various changes and modifications can be made therein without departing from the spirit of the invention as expressed in the scope of the appended claims.

What is claimed is:

1. In a vehicle having a seat assembly, a safety seat belt mounting for an elongated section of belt having an extended operating section adapted to form a part of an occupant restraint system, comprising:
   (a) an elongated, tubular member of a substantially uniform interior cross-section and having substantially rigid sidewalls of a first material, said tubular member being fixedly mounted to said vehicle;
   (b) a guide member disposed in said tubular member;
   (c) laterally directed teeth carried by said guide member having a length sufficient to provide an interference, between said teeth and the walls of said tubular member, to longitudinal movement of said guide member in said tubular member, said teeth having cutting edges formed of a second material, harder than said first material, so that the application of a predetermined force on said guide member in a longitudinal direction moves said guide member at a controlled rate with the cutting edges of said teeth abrading the walls of said tubular member; and (d) means arranged to fixedly connect said seat belt to said guide member so that a predetermined tensile force applied to said seat belt is transmitted to said guide member.

2. The seat belt mounting as defined in claim 1, wherein said tubular member has a first end section and a second end section, said guide member being disposed adjacent said first end section and being movable toward said second end section, and including apertures formed in the sidewalls of said tubular member, one of said apertures being associated with each of said teeth and each aperture providing an abutment between said teeth and said sidewalls so that an interference is created to the longitudinal movement of the guide member.

3. The seat belt mounting device as defined in claim 1, including a belt retracting device mounted to said vehicle for biasing said belt toward a stored position, said belt retracting device being yieldable to a tensile force to produce feed-out of said belt toward an extended position.

4. The seat belt mounting as defined in claim 3, wherein said belt retracting device is mounted within said tubular member.

5. The seat belt mounting as defined in claim 1, including a belt retracting device mounted in said tubular member and arranged to bias said belt to a stored position within said tubular member, said retracting device being yieldable to a tensile force applied to said belt to extend said belt through a belt receiving aperture in said tubular member.

6. The seat belt mounting as defined in claim 5, including an anchor member attached within said tubular member, the terminal end of said belt being attached to said anchor member to provide a non-yielding connection between said belt and said tubular member when said belt is fully extended.

7. The seat belt mounting as defined in claim 6, wherein said anchor member is longitudinally spaced from said belt retracting device, and including belt take-up means mounted between said guide member and said belt retracting device and operable to arrange the stored portion of said belt in a series of linear sections.

8. A seat belt mounting as defined in claim 5, including locking means responsive to a force producing a predetermined acceleration in the fed-out of said belt from said stored position toward said extended position and operable to fixedly connect said belt to said guide member.

9. The seat belt mounting as defined in claim 8, wherein said guide member has a pair of spaced apart side sections, an abutment section and first and second pairs of slots in said side sections, and including a guide roller mounted in said first pair of slots and movable therein between longitudinally spaced apart first and second positions; a clamping roller mounted in said second pair of slots for displacement toward and away from said belt and said abutment section between a belt release position and a belt clamping position, said belt being movable between said clamping roller and said abutment section and around said guide roller; a locking member interconnecting said guide roller and said clamping roller for co-acting movement so that displacement of said guide roller from said first position toward said second position moves said clamping roller from said belt release position to said belt clamping position, means normally biasing said guide roller toward said first position; and means operable upon the application of a force producing a predetermined acceleration in the feed-out rate of said belt from said stored position to said extend position to move said guide roller toward said second position.

10. The seat belt mounting as defined in claim 9, wherein said last mentioned means comprise an actuating member mounted within said tubular member and having a first cooperating abutment portion, said actuating member being pivotable between a first normal position wherein said first cooperating abutment portion is spaced from a second cooperating abutment portion on said tubular member and a second position wherein said first cooperating abutment portion is closely adjacent said second cooperating abutment portion; a guide roller mounted on said actuating member and arranged so that a predetermined increase in the feed-out of the belt produces a force on said guide roller effective to pivot said actuating member to said second position wherein said cooperating abutments temporarily anchor said belt to said tubular member so that the extended section of said belt moves said guide member from its first position toward its second position.

11. The seat belt mounting as defined in claim 10, wherein said tubular member is mounted to an overhead section of said vehicle with said belt receiving aperture being disposed above and behind an occupant of the seat assembly.

References Cited

UNITED STATES PATENTS

| | | | |
|---|---|---|---|
| 2,071,903 | 2/1937 | Shivley | 297—386 |
| 2,822,595 | 2/1958 | Ruhl | 297—388 X |
| 2,947,353 | 8/1960 | Von Wimmersperg | 297—386 |
| 3,205,004 | 9/1965 | Spouge | 297—388 |
| 3,231,307 | 1/1966 | Smith | 297—388 |

JAMES T. McCALL, *Primary Examiner.*